(12) United States Patent
Dire et al.

(10) Patent No.: US 8,481,631 B2
(45) Date of Patent: Jul. 9, 2013

(54) METHOD FOR PREPARING A POLYMER PARTICLE DISPERSION IN AN AQUEOUS MEDIUM

(75) Inventors: Charlotte Dire, Clermont Ferrand (FR); Bernadette Charleux, Lyons (FR); Stéphanie Magnet, Morlanne (FR); Laurence Couvreur, Paris (FR)

(73) Assignees: Arkema France, Colombes (FR); Centre de la Recherche Scientifique, Paris (FR); Universite Pierre et Marie Curie (Paris 6), Paris (FR)

( * ) Notice: Subject to any disclaimer, the term of this patent is extended or adjusted under 35 U.S.C. 154(b) by 361 days.

(21) Appl. No.: 12/993,334

(22) PCT Filed: May 19, 2009

(86) PCT No.: PCT/FR2009/050933
§ 371 (c)(1),
(2), (4) Date: Jan. 19, 2011

(87) PCT Pub. No.: WO2009/150367
PCT Pub. Date: Dec. 17, 2009

(65) Prior Publication Data
US 2011/0166282 A1  Jul. 7, 2011

(30) Foreign Application Priority Data
May 19, 2008  (FR) ..................... 08 53218

(51) Int. Cl.
*C08F 2/38* (2006.01)
*C08L 53/00* (2006.01)

(52) U.S. Cl.
USPC .................. 524/460; 526/318; 526/319

(58) Field of Classification Search
USPC .................. 524/460; 526/318, 319
See application file for complete search history.

(56) References Cited

FOREIGN PATENT DOCUMENTS
WO        03/070799 A2    8/2003
WO    WO 03/070799    *    8/2003

OTHER PUBLICATIONS

Nicolas et al., Macromolecules, 2006 39(24), 8274-8282.*
Delaittre, G. et al, "Surfactant-free synthesis of amphiphilic diblock copolymer nanoparticles via nitroxide-mediated emulsion polymerization," Chemical Communications, 2005, pp. 614-616; (cited in ISR, dated Apr. 12, 2009, issued in corresponding PCT/FR2009/050933).
Nicolas, J. et al., "Nitroxide-Mediated Controlled Free-Radical Emulsion Polymerization of Styrene and n-Butyl Acrylate with a Water-Soluble Alkoxyamine as Initiator," Angew. Chem. Int. Ed., No. 43, pp. 6186-6189; (cited in ISR, dated Apr. 12, 2009, issued in corresponding PCT/FR2009/050933).
Nicolas, J., et al., "Living Character of Polymer Chains Prepared via Nitroxide-Mediated Controlled Free-Radical Polymerization of Methyl Methacrylate in the Presence of a Small Amount of Styrene at Low Temperature," MACROMOLECULES, American Chemical Society, vol. 39, 2006, pp. 8274-8282; (cited in ISR, dated Apr. 12, 2009, issued in corresponding PCT/FR2009/050933).
International Search Report, dated Apr. 12, 2009, issued in corresponding PCT/FR2009/050933.
Written Opinion, dated Apr. 12, 2009, issued in corresponding PCT/FR2009/050933.

* cited by examiner

*Primary Examiner* — Robert D. Harlan
(74) *Attorney, Agent, or Firm* — Millen, White, Zelano & Branigan, P.C.

(57) ABSTRACT

The invention relates to a process for the preparation of an aqueous dispersion of polymer particles in an aqueous medium employing a living macroinitiator requiring a reinitiation temperature of less than 100° C.
Application of the particles obtained in the field of surface coatings.

17 Claims, No Drawings

METHOD FOR PREPARING A POLYMER PARTICLE DISPERSION IN AN AQUEOUS MEDIUM

TECHNICAL FIELD

The present invention relates to a process for the preparation of an aqueous dispersion of polymer particles, this process exhibiting the advantage of requiring temperatures not exceeding 100° C.

The aqueous dispersions of polymer particles obtained (also called latexes) can be used as is or else in the dry form, after evaporation of the dispersing medium, as surface-active or stabilizing agents for suspension of polymers in an aqueous medium, as additives for polymer matrices, as dispersants for organic or inorganic pigments or as compatibilizers between several polymer matrices.

The aqueous dispersions of polymer particles obtained by this process can also be used directly or else in the dry form, after evaporation of the dispersing medium, as binders or as bases for adhesive or surface coating formulations, such as paints, textile coatings, leather coatings, nonwoven coatings or paper coatings, or in cosmetic formulations.

Finally, the polymer particles obtained in dispersion or after drying can also be used as polymerization seed, namely that the polymer in suspension can be reinvolved in another polymerization stage in a dispersed medium, for example, in the presence of hydrophobic monomers, it being possible for the resulting dispersions to be used as binders or as bases for adhesive formulations, for surface coating formulations, such as paints or varnishes, for textile, leather, nonwoven or paper coatings, or in cosmetic formulations.

In cosmetics, the dispersions of the invention or their dry matter can be used in haircare products, products for caring for or making up the face, or makeup for the eyelashes or nails.

PRIOR STATE OF THE ART

Processes for the preparation of aqueous dispersions comprising polymer particles originating from a living macroinitiator have already formed the subject of numerous studies in the prior art.

Thus, a description is given, in the paper Chem. Commun., 2005, 614-616, of a process for the preparation of nanoparticles employing a macroinitiator of the poly(sodium acrylate)-$SG_1$ type, $SG_1$ being as defined below:

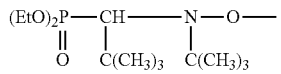

The production of particles requires a stage of initiating said macroinitiator at a temperature of 120° C. This is because, due to the very nature of the macroinitiator involved in this process (monomer of the acrylic type) and in view of the temperature for splitting an acrylic-$SG_1$ bond, it is impossible to operate at lower temperatures in order to make possible effective reinitiation and optimum insertion of the styrene or acrylate monomers intended to constitute the second block. A description is given in particular of the production at 120° C. of nanoparticles of block copolymers of the poly(sodium acrylate)-b-polystyrene or poly(sodium acrylate)-b-poly(n-butyl acrylate) type. Such temperature conditions generate an increase in pressure inside the reactor, which involves having to have polymerization equipment available which is capable of withstanding high pressures (of the order of 3 to 5 bar).

There thus exists a true need for a process for the preparation of aqueous dispersions of polymer particles which can be implemented in an aqueous medium and at temperatures not exceeding 100° C., this thus making it possible to operate at atmospheric pressure and to overcome the disadvantages related to the use of high temperatures and of an organic medium.

ACCOUNT OF THE INVENTION

Thus, the invention relates to a process for the preparation of an aqueous dispersion of polymer particles comprising the following stages:

a) a stage of bringing at least one hydrophobic methacrylate monomer, alone or as a mixture with other hydrophobic monomers, into contact, in an aqueous medium, with a living macroinitiator, this living macroinitiator being obtained by polymerization of one or more monomers in the presence of an alkoxyamine control agent corresponding to either of the following formulae (I) and (III):

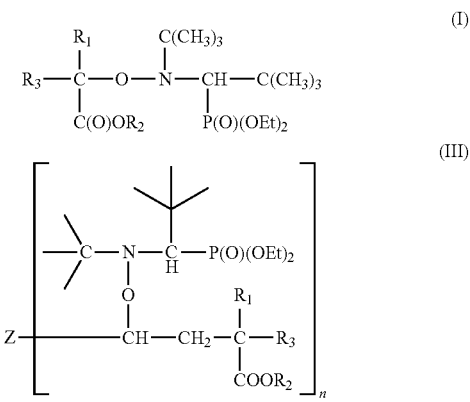

in which:

$R_1$ and $R_3$, which are identical or different, represent a linear or branched alkyl group having a number of carbon atoms ranging from 1 to 3;

$R_2$ represents a hydrogen atom, a linear or branched alkyl group having a number of carbon atoms ranging from 1 to 8, a phenyl group, an alkali metal, such as Li, Na or K, or an ammonium ion, such as $NH_4^+$ or $NHBu_3^+$; preferably, $R_1$ and $R_3$ being $CH_3$ and $R_2$ being H;

Z represents an aryl group or a group of formula $Z_1$—[X—C(O)]$_n$, in which $Z_1$ represents a polyfunctional structure originating, for example, from a compound of the polyol type, X is an oxygen atom, a nitrogen atom, carrying a carbon-based group or a hydrogen atom, or a sulfur atom, and n is an integer greater than or equal to 2;

one at least of the monomers participating in the structure of the living macroinitiator being a hydrophilic methacrylic or methacrylate monomer and the macroinitiator obtained being capable of being set under way again in a polymerization reaction at a temperature of less than 100° C.;

b) a stage of heating at a temperature of less than 100° C., by means of which the polymerization of the monomer or monomers mentioned in stage a) is set under way starting from the macroinitiator as defined in stage a).

It is specified that the abbreviation Et corresponds to the ethyl group and that the abbreviation Bu corresponds to the butyl group, which can exist in different isomeric forms (n-butyl, sec-butyl, tert-butyl).

By virtue of the process of the invention, an aqueous dispersion of particles composed of a block copolymer, namely a first block corresponding to the sequence of the living macroinitiator, said first block comprising repeat units resulting from the polymerization of at least one hydrophilic methacrylic or methacrylate monomer, and a second block covalently bonded to the first block, said second block comprising a series of repeat units resulting from the polymerization of at least one hydrophobic methacrylate monomer, is thus obtained.

From a structural viewpoint, the constituent particles of the aqueous dispersion obtained according to the process of the invention have the ability to fold over on themselves, forming a core comprising the hydrophobic part and, around the core, unfurled chains constituting the hydrophilic part. It is thus possible to speak of hairy particles.

The process of the invention exhibits the following advantages:
  the possibility of setting under way a reinitiating stage at a temperature of less than 100° C. and in an aqueous medium, by virtue of the discovery, by the inventors, of macroinitiators capable of being restarted, in an aqueous medium, at such a temperature level, this temperature level being advantageous for a manufacturer, in terms of manufacturing costs, of energy consumption and of reproducibility;
  the fact that the process takes place in an aqueous medium makes it possible to circumvent all the disadvantages related to the use of an organic solvent medium (such as the nontoxicity to the personnel in charge of manufacturing and the problems related to discharge into the atmosphere) and the particles obtained at the end of the process can be used as is, namely without requiring post-treatment stages.

According to the invention, it is specified that the term "living macroinitiator" is understood to mean a polymer comprising at least one end capable of being set under way again in a polymerization reaction by addition of monomers at an appropriate temperature and an appropriate pressure. The term "living macroinitiator" also corresponds to the terminology "living polymer".

According to the invention, the macroinitiator is capable of being set under way again in a polymerization reaction at a temperature of less than 100° C. and advantageously at atmospheric pressure.

The living macroinitiators of the invention result from the polymerization, in the presence of control agents of formulae (I) and/or (III) as defined above, of one or more hydrophilic methacrylic or methacrylate monomers, so that the resulting macroinitiators can be set under way again in a polymerization reaction in an aqueous medium at a temperature of less than 100° C.

It is specified that the term "hydrophilic monomers" is understood to mean a monomer exhibiting one or more functional groups capable of establishing hydrogen bonds with water.

The term "hydrophilic methacrylate monomer" is understood to mean a methacrylate monomer, the hydrophilic nature of which is conferred by pendant hydrophilic functional groups, such as a polyalkylene glycol functional group.

The hydrophilic nature of a methacrylic monomer is conventionally conferred on it by the pendant carboxyl functional group.

Hydrophilic methacrylic or methacrylate monomers can advantageously be methacrylic acid, methacrylic acid salts (such as alkali metal salts, such as sodium salts), a poly (alkylene glycol) methacrylate (such as polyethylene glycol methacrylate) and mixtures of these.

The macroinitiator can additionally comprise repeat units resulting from the polymerization of hydrophilic monomers other than those mentioned above, among which may be mentioned hydrophilic styrene monomers, such as styrenesulfonate, or acrylamide or methacrylamide monomers, which may or may not be substituted.

The macroinitiator can also comprise repeat units resulting from the polymerization of hydrophobic monomers.

Hydrophobic monomers capable of participating in the structure of the living macroinitiators used in the process of the invention are advantageously styrene monomers, such as styrene or α-methylstyrene.

In this scenario, namely when the macroinitiator comprises repeat units resulting from monomers other than hydrophilic methacrylic or methacrylate monomers, it is preferable for the living macroinitiator to comprise a proportion of greater than 80 mol %, more preferably of greater than 90 mol %, of repeat units resulting from the polymerization of hydrophilic methacrylic or methacrylate monomers as defined above (the remainder up to 100% being composed of monomers other than the hydrophilic methacrylic or methacrylate monomers), so that the polymerization can be easily set under way again at a temperature of less than 100° C. The percentages in moles are given with respect to the total number of moles of the starting mixture of monomers.

The proportion of repeat units resulting from hydrophobic monomers is advantageously less than 20 mol % and more specifically can range from 4 to 9 mol %.

A living macroinitiator which can advantageously be used in accordance with the process of the invention is a copolymer comprising repeat units resulting from the polymerization of methacrylic acid and styrene (and this at a content preferably ranging from 4 to 9 mol %), it being possible for the methacrylic acid to be in the form of a salt, such as a sodium salt.

As mentioned above, the macroinitiators are prepared by polymerization of at least one hydrophilic methacrylic or methacrylate monomer, such as methacrylic acid, and optionally of a hydrophobic monomer, such as styrene, in the presence of control agents of formulae (I) and/or (III) as defined above.

Mention may be made, as example of control agent capable of being used, of the alkoxyamine corresponding to the following formula:

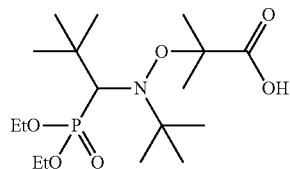 [SMILES: CCOP(=O)(OCC)C(N(OC(C)(C)C(=O)O)C(C)(C)C)C(C)(C)C]

The control agents of formula (III) generally result from a process consisting in reacting one or more alkoxyamines of the following formula (I):

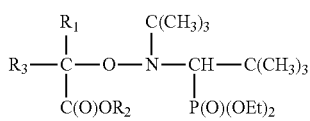
(I)

in which $R_1$, $R_2$ and $R_3$ are as defined above,
with at least one polyunsaturated compound of formula (II):

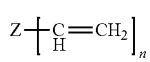
(II)

in which Z represents an aryl group or a group of formula $Z_1$—[X—C(O)]$_n$, in which $Z_1$ represents a polyfunctional structure originating, for example, from a compound of the polyol type, X is an oxygen atom, a nitrogen atom, carrying a carbon-based group or a hydrogen atom, or a sulfur atom and n is an integer greater than or equal to 2, in the presence or absence of solvent(s) preferably chosen from alcohols, such as ethanol, aromatic solvents, chlorinated solvents, ethers and polar aprotic solvents, at a temperature generally ranging from 0 to 90° C., preferably from 25 to 80° C., the molar ratio of monofunctional alkoxyamine(s) of formula (I) to polyunsaturated compound(s) of formula (II) ranging from 1.5 to 1.5 n, preferably from n to 1.25 n, n being as defined above.

Mention may be made, as examples of polyunsaturated compounds which can be used to produce polyfunctional alkoxyamines as defined above, of polyfunctional vinylbenzenes (Z then being an aryl group) or polyfunctional acrylic derivatives (Z then being a group of formula $Z_1$—[X—C(O)]$_n$). Preferably, the polyunsaturated compound is divinylbenzene, trivinylbenzene, ethylene glycol diacrylate, 1,3-butanediol diacrylate, 1,4-butanediol diacrylate, 1,6-hexanediol diacrylate, neopentyl glycol diacrylate, cyclohexane dimethanol diacrylate, diethylene glycol diacrylate, triethylene glycol diacrylate, tetraethylene glycol diacrylate, dipropylene glycol diacrylate, tripropylene glycol diacrylate, polyethylene glycol diacrylates (sold by Sartomer under the names SR259, SR344 and SR610), hexanediol alkoxylate diacrylates (sold by Sartomer under the names CR561, CD564 and CD560), bisphenol A diacrylate, bisphenol A ethoxylate diacrylates (sold by Sartomer under the names SR349, SR601, SR602 and CD9038), trimethylolpropane triacrylate, pentaerythritol triacrylate, tris(2-hydroxyethyl) isocyanurate triacrylate, trimethylolpropane ethoxylate triacrylates, (sold by Sartomer under the names SR454, SR499, SR502, SR9035 and SR415), glyceryl propoxylate triacrylate (sold by Sartomer under the name SR9020), trimethylolpropane propoxylate triacrylates (sold by Sartomer under the names SR492 and CD501), pentaerythritol tetraacrylate, ditrimethylolpropane tetraacrylate, pentaerythritol ethoxylate tetraacrylate (sold by Sartomer under the name SR494), dipentaerythritol pentaacrylate, caprolactones-modified dipentaerythritol hexaacrylate (sold by Sartomer under the names Kayarad DCPA20 and DCPA60) or dipentaerythritol polyacrylate (sold by UCB Chemicals under the name DPHPA).

When Z corresponds to the formula $Z_1$—[X—C(O)]$_n$, the control agents correspond to the following formula (IIIa):

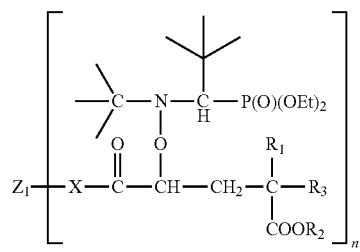
(IIIa)

$Z_1$ generally corresponding to an alkylene group.

A specific example of control agent in accordance with the general definition given above is the polyfunctional alkoxyamine corresponding to the following formula:

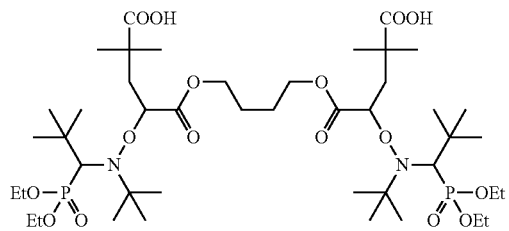 [SMILES: CCOP(=O)(OCC)C(N(OC(CC(C)(C)C(=O)O)C(=O)OCCCCOC(=O)C(CC(C)(C)C(=O)O)ON(C(C(C)(C)C)P(=O)(OCC)OCC)C(C)(C)C)C(C)(C)C)C(C)(C)C]

this polyfunctional alkoxyamine resulting from the reaction of a monofunctional alkoxyamine of formula (I) with 1,4-butanediol diacrylate.

With such control agents, a living macroinitiator comprising an end of following formula:

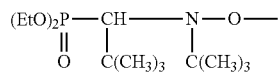

this end being denoted by the abbreviation $SG_1$, is thus obtained.

This macroinitiator comprising such a reactive end can be set under way again in a polymerization reaction at a temperature of less than 100° C. by means of the addition of monomers, which is the case during the implementation of stage a).

The monomers added in stage a) are hydrophobic methacrylate monomers which can advantageously be alkyl methacrylates, such as methyl methacrylate.

In addition to the abovementioned hydrophobic methacrylate monomers, the monomers added during stage a) can be hydrophobic monomers chosen from alkyl acrylates, styrene monomers (such as styrene) and mixtures of these and/or hydrophilic monomers, such as those listed above for the structure of the living macroinitiator.

In the case where monomers other than hydrophobic methacrylate monomers are added during stage a), the hydrophobic methacrylate monomers will advantageously be present in a proportion of greater than 80 mol %, preferably of greater than 90 mol %, with respect to the total number of moles of monomers introduced during stage a), the remainder up to 100% consisting of the monomers other than the hydrophobic methacrylate monomers.

It is specified that the addition stage a) is carried out in an aqueous medium, that is to say a medium predominantly comprising water.

Finally, stage b) consists in bringing the medium generated in stage a) to a temperature of less than 100° C., by means of which the polymerization of the monomer or monomers mentioned in stage a) is set under way starting from the macroinitiator as defined in stage a).

In the case of a living macroinitiator of the poly(sodium methacrylate-co-styrene)-$SG_1$ type, the reinitiating temperature is less than 70° C.

The process of the invention can additionally comprise a stage of polymerization, to give a polymer, of the monomers not converted during stage b), said polymer being similar in chemical nature to the block created during stage b) and thus being compatible with said block.

The term "polymer compatible with said block" is understood to mean a polymer capable of interacting with said block, said to be miscible in said block.

This polymerization stage is carried out conventionally after stage b) by conventional radical polymerization, namely by addition, to the medium in which the block has just been produced, of a "conventional" radical polymerization initiator generally chosen from peroxide compounds (such as a peroxide compound of the Luperox™ range), persulfate compounds (such as sodium persulfate, potassium persulfate or ammonium persulfate), azo compounds (such as azobisisobutyronitrile, called AiBN, 2,2'-azobis(2-amidinopropane)dihydrochloride and the metal and ammonium salts of 4,4'-azobis(4-cyanopentanoic acid)) or redox compounds (such as the persulfate (sodium, potassium or ammonium)/vitamin C pair, the sodium or potassium persulfate/metabisulfite pair, the aqueous hydrogen peroxide solution/salts of the ferrous ion pair, the tert-butyl hydroperoxide/sodium sulfoxylate pair and any other possible oxidizing agent(s)/reducing agent(s) combination).

Particles capable of being prepared in suspension in an aqueous medium in accordance with the process of the invention can be particles made of a poly(sodium methacrylate-co-styrene)-b-polyalkyl methacrylate, poly(sodium methacrylate-co-styrene)-b-poly(alkyl methacrylate-co-styrene) or poly(sodium methacrylate-co-sodium styrenesulfonate)-b-poly(methyl methacrylate-co-styrene) block copolymer.

The particles prepared according to the process of the invention are nanometric particles, that is to say particles exhibiting a diameter ranging from 10 to 500 nm and more specifically from 30 to 120 nm.

Another subject matter of the invention is aqueous dispersions comprising particles capable of being obtained by the process as defined above.

Finally, the process of the invention can comprise, if need be, a stage of isolation of the particles from the aqueous medium, it being possible for this isolation stage to be carried out, for example, by coagulation or atomization techniques, optionally in combination with a drying stage (corresponding to an evaporation of the dispersing medium).

Thus, the invention also relates to a process for the preparation of polymer particles comprising:
- a stage of carrying out a process for the preparation of an aqueous dispersion of polymer particles as defined above; and
- a stage of isolating said particles;

and also particles capable of being obtained by said process.

Due to their intrinsic properties, the aqueous dispersions of the invention can have applications in the field of surface coatings.

By virtue of the amphiphilic nature of the polymer particles constituting the aqueous dispersions of the invention, the dispersions are self-stabilized in an aqueous medium due to the surface-active properties generated by the above-mentioned amphiphilicity.

The polymer particles can be used as is in dispersion or else in the dry form, after evaporation of the dispersing medium.

Thus, the particles of the invention can be used as surface-active or stabilizing agents for suspensions of polymers in an aqueous medium, as additives for polymer matrices, as dispersants for organic or inorganic pigments or as compatibilizers between several polymer matrices.

The aqueous dispersions of polymer particles obtained by this process can also be used directly or else in the dry form, after evaporation of the dispersing medium, as binders or as bases for adhesive or surface coating formulations or in cosmetic formulations, or also as polymerization seed, for example, in the presence of hydrophobic monomers, it being possible for the resulting dispersions to be used as binders or bases for adhesive formulations, surface coating formulations, such as paints or varnishes, or textile, leather, nonwoven or paper coatings, or in cosmetic formulations.

The abovementioned dispersions can also have the property of forming polymer films once the dispersing medium has been evaporated, such film forming properties being advantageous for coatings, such as paints, varnishes or textile, leather, nonwoven or paper coatings, or in cosmetics (such as for haircare products or products for making up the eyelashes or nails).

The polymer particles obtained can be isolated from the aqueous medium in which they were synthesized and can be used subsequently in another medium for the abovementioned applications.

The invention will now be described using the following examples, given by way of illustration and without implied limitation.

EXAMPLE 1

Preparation of the Poly(Methacrylic Acid-Co-Styrene) Macroinitiator

Example 1 illustrates the preparation of a poly(methacrylic acid-co-styrene) living copolymer used as macroinitiator, control agent and stabilizer for the implementation of the process of the invention, the methacrylic acid and the styrene being abbreviated to MAA and Sty.

To do this, a mixture comprising 62.4 g of methacrylic acid (4.37 mol·l$^{-1}$), 7.3 g of styrene (0.424 mol·l$^{-1}$), 0.464 g of free $SG_1$ (9.5×10$^{-3}$ mol·l$^{-1}$) and 99.47 g of 1,4-dioxane (96.2 ml) is degassed at ambient temperature by bubbling with nitrogen for 20 minutes. The alkoxyamine BlocBuilder® (sold by Arkema) (5.94 g, 9.4×10$^{-2}$ mol·l$^{-1}$) is subsequently added, this alkoxyamine corresponding to the following formula:

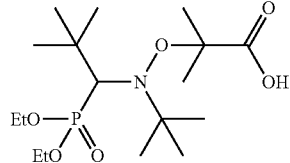 [SMILES: CCOP(=O)(OCC)C(N(OC(C)(C)C(=O)O)C(C)(C)C)C(C)(C)C]

and the degassing is continued for 10 minutes. The degassed mixture is introduced into a 500 ml three-necked flask preheated to 73° C. and surmounted by a reflux condenser, a nitrogen inlet and a thermometer. The polymerization is carried out at 73° C. and the time t=0 is started when the temperature reaches 70° C. in the reaction medium. The macroinitiator obtained is P(MAA-co-Sty)-SG$_1$. Samples are taken at regular time intervals in order to:
- determine the polymerization kinetics (determination of the conversions by $^1$H NMR (d$_6$-DMSO, 250 MHz));
- monitor the change in the number-average molar masses (Mn) as a function of the conversion of monomers.

The change in the conversions as a function of the time and also the change in the number-average molar masses with the conversion are presented in table 1 below.

The theoretical and experimental M$_n$ values are determined by steric exclusion chromatography in THF, with calibration with polymethyl methacrylate, after methylation of the methacrylic acid units to give methyl methacrylate units.

The polydispersity index I$_p$ is calculated from methyl methacrylate units.

TABLE 1

| Time (min) | Conversion (%) | M$_n$, experimental (g · mol$^{-1}$) | M$_n$, theoretical (g · mol$^{-1}$) | I$_p$ |
|---|---|---|---|---|
| 15 | 20 | 1300 | 1400 | 1.59 |
| 40 | 26 | 1500 | 1700 | 1.63 |
| 60 | 31 | 1750 | 1950 | 1.66 |
| 80 | 36 | 1950 | 2200 | 1.68 |
| 110 | 37 | 2500 | 2300 | 1.5 |

EXAMPLE 2

Example 2 illustrates the synthesis of hairy nanoparticles of poly(sodium methacrylate-co-styrene)-b-polymethyl methacrylate block copolymers from the macroinitiator prepared in example 1.

64.8 g. of deionized water, 1.26 g of macroinitiator P(MAA-co-Sty)-SG$_1$ (5.25×10$^{-4}$ mol) prepared in example 1, 15.2 g of 1M sodium hydroxide solution (1 eq. with respect to the methacrylic acid units) and 0.301 g of Na$_2$CO$_3$ (3.56× 10$^{-2}$ mol·l$^{-1}$) are introduced into a 250 ml single-necked round-bottomed flask. This mixture is stirred at ambient temperature for approximately 15 minutes until the macroinitiator, which is then in the poly(sodium methacrylate-co-styrene) form, has completely dissolved. 20.39 g of methyl methacrylate are subsequently added (level of solids=20%) and the mixture is degassed by bubbling with nitrogen at ambient temperature for 30 minutes. The temperature is subsequently increased to 40° C. and the time t=0 is arbitrarily started at the beginning of the rise in temperature. Samples are taken at regular intervals in order to:
- determine the polymerization kinetics by gravimetric analysis (measurement of dry matter);
- monitor the change in the number-average molar masses (Mn) with the conversion of monomers;
- evaluate the colloidal characteristics of the latex (average diameter of the particles, size distribution of the particles (polydispersity)). The results obtained are present in table 2 below.

TABLE 2

| Time (h) | Conversion (%) | M$_{n,exp.}$[a] (g · mol$^{-1}$) | M$_{n,theo.}$[b] (g · mol$^{-1}$) | I$_p$[a] | f[c] | dz[d] (nm) | σ[e] | N$_p$[f] (10$^{14}$/cm$^3$) |
|---|---|---|---|---|---|---|---|---|
| 1.5 | 20.8 | 56 200 | 10 800 | 1.5 | 0.15 | — | — | — |
| 2 | 27.2 | 53 700 | 13 200 | 1.57 | 0.21 | 99 | 0.003 | 9.63 |
| 4 | 42.1 | 47 500 | 19 000 | 1.77 | 0.36 | 113 | 0.034 | 1.00 |
| 5 | 50.7 | 49 100 | 22 300 | 1.68 | 0.42 | 118 | 0.012 | 1.06 |
| 6 | 54.3 | 49 200 | 23 700 | 1.69 | 0.45 | 120 | 0.011 | 1.08 |
| 30.5 | 72.6 | 34 900 | 30 800 | 2.07 | 0.87 | 123 | 0.023 | 1.34 |
| 46.5 | 73.6 | 35 300 | 31 200 | 2.06 | 0.88 | 119 | 0.021 | 1.50 |

(a) Determined by steric exclusion chromatography in THF, with calibration with polymethyl methacrylate, after methylation of the methacrylic acid units to give methyl methacrylate units;

(b) Calculated from methyl methacrylate units;

(c) Efficiency of initiation;

(d) Z-average diameter of the particles;

(e) Polydispersity of the latexes;

(f) Number of particles.

The latex obtained at the end of polymerization is stable and exhibits excellent colloidal characteristics with in particular a narrow distribution of the particle sizes.

EXAMPLE 3

Example 3 illustrates the synthesis of hairy nanoparticles of poly(sodium methacrylate-co-styrene)-b-poly(methyl methacrylate-co-styrene) block copolymers from the macroinitiator prepared in example 1.

64.6 g of deionized water, 1.27 g of macroinitiator P(MAA-co-Sty)-SG$_1$ (5.29×10$^{-4}$ mol) prepared in example 1, 15.2 g of 1M sodium hydroxide solution (1 eq. with respect to the methacrylic acid units) and 0.301 g of Na$_2$CO$_3$ (3.56× 10$^{-2}$ mol·l$^{-1}$) are introduced into a 250 ml single-necked round-bottomed flask. This mixture is stirred at ambient temperature for approximately 15 minutes until the macroinitiator, which is then in the poly(sodium methacrylate-co-styrene) form, has completely dissolved. 19.38 g of methyl methacrylate and 0.64 g of styrene are subsequently added (level of solids=19.7%) and the mixture is degassed by bubbling with nitrogen at ambient temperature for 30 minutes. The temperature is subsequently increased to 60° C. and the time t=0 is arbitrarily started at the beginning of the rise in temperature. Samples are taken at regular intervals in order to:
- determine the polymerization kinetics by gravimetric analysis (measurement of dry matter);
- monitor the change in the number-average molar masses (Mn) with the conversion of monomers;
- evaluate the colloidal Characteristics of the latex (average diameter of the particles, size distribution of the particles (polydispersity)). The results obtained are presented in table 3 below.

TABLE 3

| Time (h) | Conversion (%) | $M_{n,exp.}^{a}$ (g·mol$^{-1}$) | $M_{n,theo.}^{b}$ (g·mol$^{-1}$) | $I_p^{a}$ | $f^c$ | $dz^d$ (nm) | $\sigma^e$ | $N_p^f$ ($10^{15}$/cm$^3$) |
|---|---|---|---|---|---|---|---|---|
| 1.5 | 11.2 | 7700 | 6900 | 2.1 | 0.86 | — | — | — |
| 2.5 | 18.8 | 11 400 | 9800 | 1.53 | 0.82 | — | — | — |
| 3.5 | 23.4 | 12 300 | 11 600 | 1.59 | 0.92 | — | — | — |
| 5 | 29.9 | 14 400 | 14 000 | 1.53 | 0.97 | — | — | — |
| 6.33 | 34.9 | 17 800 | 15 900 | 1.39 | 0.88 | — | — | — |
| 23 | 77.1 | 36 300 | 31 900 | 1.27 | 0.87 | 47.4 | 0.211 | 2.45 |
| 53.5 | 78.7 | 36 800 | 32 500 | 1.25 | 0.87 | 48.2 | 0.306 | 2.38 |

(a) Determined by steric exclusion chromatography in THF, with calibration with polymethyl Methacrylate, after methylation of the methacrylic acid units to give methyl methacrylate units;
(b) Calculated from methyl methacrylate units;
(c) Efficiency of initiation;
(d) Z-average diameter of the particles;
(e) Polydispersity of the latexes;
(f) Number of particles.

The latex obtained at the end of polymerization is stable and the diameter of the particles, obtained by dynamic light scattering, is low (approximately 48 nm). The size distribution of the particles is broader (a approximately from 0.2 to 0.3) than for the homopolymerization of methyl methacrylate at 40° C.

EXAMPLE 4

Preparation of the Poly(Methacrylic Acid-Co-Sodium Sytrenesulfonate) Macroinitiator Example 4 illustrates the preparation of poly(methacrylic acid-co-sodium styrenesulfonate) living copolymer used as macroinitiator, control agent and stabilizer for the implementation of the process of the invention, the methacrylic acid and the sodium styrenesulfonate being abbreviated to MAA and SS.

To do this, a mixture comprising 24 g of methacrylic acid (2.0 mol·l$^{-1}$), 6.17 g of sodium styrenesulfonate (0.193 mol·l$^{-1}$) and 127.34 g of dimethyl suboxide is degassed at ambient temperature by bubbling with nitrogen for 20 minutes. The alkoxyamine BlocBuilder® (as in example 1) is subsequently added (1.197 g, 2.23×10$^{-2}$ mol·l$^{-1}$). The degassing is continued for 10 minutes. The degassed mixture is introduced into six Schlenk tubes with capacities of 25 ml. Six freezing/defrosting cycles are carried out in order to eliminate any trace of oxygen. The polymerization is carried out at 76° C. and the time t=0 is started. The macroinitiator obtained is P(MAA-co-SS)-SG$_1$. Samples are taken at regular time intervals in order to:
 determine the polymerization kinetics (determination of the conversions by $^1$H NMR (d$_6$-DMSO, 200 MHz));
 monitor the change in the number-average molar masses (Mn) as a function of the conversion of monomers.

The change in the conversions as a function of time and also the change in the number-average molar masses with the conversion are presented in table 4 below.

TABLE 4

| Time (min) | Conversion by weight (%) | $M_{n,experimental}$ (g·mol$^{-1}$) | $M_{n,theoretical}$ (g·mol$^{-1}$) | $I_p$ |
|---|---|---|---|---|
| 15 | 24 | 7300 | 2700 | 1.25 |
| 30 | 42 | 8180 | 4350 | 1.25 |
| 45 | 45.4 | 9230 | 4700 | 1.2 |
| 60 | 54.4 | 10 680 | 5550 | 1.18 |
| 90 | 60.2 | 11 470 | 6100 | 1.18 |
| 120 | 85 | 12 290 | 8500 | 1.18 |

The experimental $M_n$ values are determined by steric exclusion chromatography in solution in water comprising 0.5 mol % of LiNO$_3$ using a device equipped with triple detection and the $M_n$ calculations are based on the light scattering signal and the refractive index.

EXAMPLE 5

Example 5 illustrates the synthesis of hairy nanoparticles of poly(sodium methacrylate-co-sodium-styrenesulfonate)-b-poly(methyl methacrylate-co-styrene) block copolymers from the macroinitiator prepared in example 4.

25.78 g of deionized water, 1.8816 g of macroinitiator P(MAA-co-SS)-SG$_1$ (2.73×10$^{-3}$ mol) prepared in example 4, 18.8 g of 1M sodium hydroxide solution (1 eq. with respect to the methacrylic acid units) and 0.1693 g of Na$_2$CO$_3$ (3.58× 10$^{-2}$ mol·l$^{-1}$) are introduced into a 100 ml single-necked round-bottomed flask. This mixture is stirred at ambient temperature for approximately 15 minutes until the macroinitiator, which is then in the poly(sodium methacrylate-co-sodium styrenesulfonate) form, has completely dissolved. 18.8 g of methyl methacrylate and 1.09 g of styrene are subsequently added (level of solids=19.32%) and the mixture is degassed by bubbling with nitrogen at ambient temperature for 30 minutes. The temperature is subsequently increased to 85° C. and the time t=0 is started at 60° C. Samples are taken at regular intervals in order to
 determine the polymerization kinetics by gravimetric analysis (measurement of dry matter);
 monitor the change in the number-average molar masses (Mn) with the conversion of monomers;
 evaluate the colloidal characteristics of the latex (average diameter of the particles, size distribution of the particles (polydispersity)). The results obtained are presented in the following table 5.

TABLE 5

| Time (h) | Conversion (%) | $M_{n,exp.}^{a}$ (g·mol$^{-1}$) | $M_{n,theo.}^{b}$ (g·mol$^{-1}$) | $I_p^{a}$ | $dz^c$ (nm) | $\sigma^d$ |
|---|---|---|---|---|---|---|
| 0.916 | 42 | 33 000 | 50 600 | 1.23 | — | — |
| 2.5 | 57.5 | — | 64 600 | — | — | — |
| 3.25 | 61.7 | 47 200 | 68 450 | 1.4 | — | — |
| 5 | 67.8 | 58 200 | 74 000 | 1.3 | — | — |
| 7 | 69 | — | 75 000 | — | 45.8 | 0.076 |
| 8 | 7.5 | 59 800 | 76 500 | 1.3 | 39.5 | 0.133 |

(a) Determined by steric exclusion chromatography in DMF, with calibration with polymethyl methacrylate, after Methylation of the methacrylic acid units to give methyl methacrylate units;
(b) Calculated from methyl methacrylate units;
(c) Number-average diameter of the particles;
(d) Polydispersity of the latexes.

The latex obtained at the end of polymerization is stable and the diameter of the particles, obtained by dynamic light scattering, is low (approximately 40 nm). The size distribution of the particles is relatively narrow (a approximately from 0.08 to 0.1).

What is claimed is:

1. A method for the preparation of an aqueous dispersion of polymer particles comprising the following stages:
   a) a stage of bringing at least one hydrophobic methacrylate monomer, alone or as a mixture with other hydrophobic monomers, into contact, in an aqueous medium, with a living macroinitiator, this living macroinitiator being obtained by polymerization of one or more monomers in the presence of an alkoxyamine control agent corresponding to either of the following formulae:

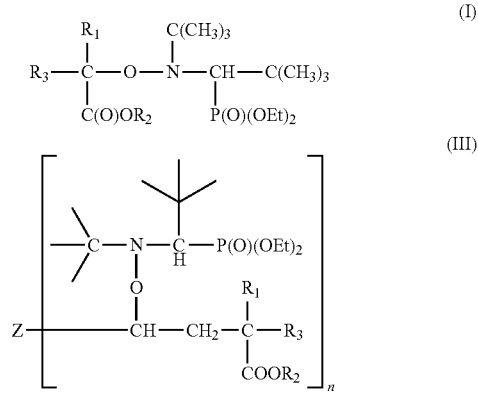

in which:
   $R_1$ and $R_3$, which are identical or different, represent a linear or branched alkyl group having a number of carbon atoms ranging from 1 to 3;
   $R_2$ represents a hydrogen atom, a linear or branched alkyl group having a number of carbon atoms ranging from 1 to 8, a phenyl group, an alkali metal or an ammonium ion;
   Z represents an aryl group or a group of formula $Z_1$—[X—C(O)]$_n$, in which $Z_1$ represents a polyfunctional structure originating, for example, from a compound of the polyol type, X is an oxygen atom, a nitrogen atom, carrying a carbon-based group or a hydrogen atom, or a sulfur atom, and
n is an integer greater than or equal to 2;
   one at least of the monomers participating in the structure of the living macroinitiator being a hydrophilic methacrylic or methacrylate monomer and the macroinitiator obtained being capable of being set under way again in a polymerization reaction at a temperature of less than 100° C.;
   b) a stage of heating at a temperature of less than 100° C., by means of which the polymerization of the monomer or monomers mentioned in stage a) is set under way starting from the macroinitiator as defined in stage a).

2. A method according to claim 1, in which the hydrophilic methacrylic or methacrylate monomer is chosen from methacrylic acid, methacrylic acid salts, a poly(alkylene glycol) methacrylate and mixtures of these thereof.

3. A method according to claim 1, in which the macroinitiator comprises repeating units resulting from the polymerization of at least one additional hydrophilic monomer other than methacrylic or methacrylate monomers, said additional hydrophilic monomer being chosen from hydrophilic styrene monomers, styrenesulfonate, or acrylamide or methacrylamide monomers, which may or may not be are optionally substituted.

4. A method according to claim 1, in which the living macroinitiator additionally comprises repeat repeating units resulting from the polymerization of at least one hydrophobic styrene monomer, such as styrene or α-methylstyrene.

5. A method according to claim 3, in which the living macroinitiator comprises a proportion of greater than 80 mol %, of repeating units resulting from the polymerization of at least one hydrophilic methacrylic or methacrylate monomer.

6. A method according to claim 4, in which the living macroinitiator is a copolymer comprising repeating units resulting from the polymerization of methacrylic acid and styrene.

7. A method according to claim 1, in which the control agent corresponds to the following formula:

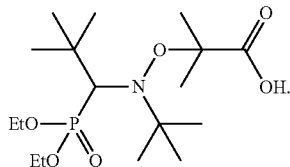

8. A method according to claim 1, in which the control agent corresponds to the following formula:

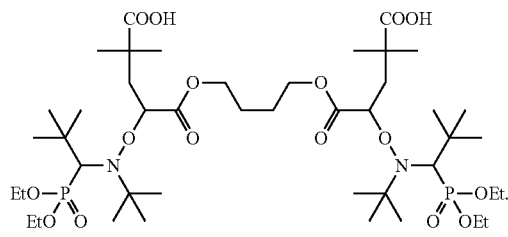 [SMILES: CCOP(=O)(OCC)C(N(OC(CC(C)(C)C(=O)O)C(=O)OCCCCOC(=O)C(CC(C)(C)C(=O)O)ON(C(C(C)(C)C)P(=O)(OCC)OCC)C(C)(C)C)C(C)(C)C)C(C)(C)C]

9. A method according to claim 1, in which the living macroinitiator comprises an end SG$_1$ with the following formula:

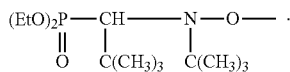

10. A method according to claim 1, in which the hydrophobic methacrylate monomer in stage (a) is an alkyl methacrylate.

11. A method according to claim 1, in which other hydrophobic monomers are added during stage a) chosen from alkyl acrylates, styrene monomers, styrene, and mixtures thereof and/or at least one hydrophilic monomer.

12. A method according to claim 11, in which the hydrophobic methacrylate monomer or monomers are present in a proportion of greater than 80 mol %, with respect to the total number of moles of monomers introduced during stage a).

13. A method according to claim 1, additionally comprising a stage of polymerization, to yield a polymer, of any monomer or monomers not converted during stage b).

14. An aqueous dispersion of particles produced by the method as defined in claim 1.

15. In a stabilized suspension of polymers in aqueous medium, the improvement wherein the stabilizing agent is as defined in claim 14.

16. A method according to claim 5, in which the living macroinitiator comprises a proportion of greater than 90 mol %, of repeating units resulting from the polymerization of at least one hydrophilic methacrylic or methacrylate monomer.

17. A method according to claim 12, wherein said proportion is greater than 90 mol %.

* * * * *